US010216161B2

(12) United States Patent
Banerjee et al.

(10) Patent No.: US 10,216,161 B2
(45) Date of Patent: Feb. 26, 2019

(54) SYSTEMS AND METHODS FOR GENERATING OPERATIONAL INTELLIGENCE FOR HEATING VENTILATION AND AIR CONDITIONING (HVAC) DEVICES

(71) Applicant: CARRIER CORPORATION, Jupiter, FL (US)

(72) Inventors: Joy Banerjee, Durgapur (IN); Yoganathan Murugesan, Trichy District (IN)

(73) Assignee: CARRIER CORPORATION, Jupiter, FL (US)

( * ) Notice: Subject to any disclaimer, the term of this patent is extended or adjusted under 35 U.S.C. 154(b) by 167 days.

(21) Appl. No.: 15/179,312

(22) Filed: Jun. 10, 2016

(65) Prior Publication Data

US 2017/0284692 A1 Oct. 5, 2017

(30) Foreign Application Priority Data

Mar. 31, 2016 (IN) .............................. 201641011368

(51) Int. Cl.
*F24F 11/46* (2018.01)
*G05B 19/042* (2006.01)
(Continued)

(52) U.S. Cl.
CPC ........ *G05B 19/042* (2013.01); *F24F 11/0008* (2013.01); *F24F 11/30* (2018.01);
(Continued)

(58) Field of Classification Search
CPC ........ F24F 11/0012; F24F 11/62; F24F 11/30; F24F 11/0008; F24F 2110/12;
(Continued)

(56) References Cited

U.S. PATENT DOCUMENTS

| 4,105,063 A | 8/1978 | Bergt |
| 5,778,147 A | 7/1998 | Kim |

(Continued)

FOREIGN PATENT DOCUMENTS

CN          101818550          9/2010

OTHER PUBLICATIONS

European Search Report for application EP 16186046.5, dated Jul. 28, 2017, 8 pages.

*Primary Examiner* — Robert E Fennema
*Assistant Examiner* — Marzia T Monty
(74) *Attorney, Agent, or Firm* — Cantor Colburn LLP

(57) ABSTRACT

This disclosure relates to a method and system for generating operational intelligence for a Heating Ventilation and Air Conditioning (HVAC) device. In one embodiment, the method includes detecting, via a plurality of sensors, a plurality of ambient parameters with respect to a building at periodic intervals; computing, via a processor, a plurality of performance parameters at the periodic intervals based on the plurality of ambient parameters; determining, via the processor, a plurality of operation parameters during an unoccupied period based on the plurality of ambient parameters and the plurality of performance parameters; and dynamically providing, via the processor, a recommendation regarding optimum operation for the HVAC device during the unoccupied period based on the plurality of operation parameters during the unoccupied period.

18 Claims, 3 Drawing Sheets

(51) Int. Cl.
*F24F 11/00* (2018.01)
*F24F 11/30* (2018.01)
*F24F 11/62* (2018.01)
*F24F 110/00* (2018.01)
*F24F 110/10* (2018.01)
*F24F 110/12* (2018.01)
*F24F 110/20* (2018.01)
*F24F 140/60* (2018.01)
*F24F 140/30* (2018.01)
*F24F 11/64* (2018.01)
*F24F 11/65* (2018.01)
*F24F 11/56* (2018.01)

(52) U.S. Cl.
CPC ............... *F24F 11/62* (2018.01); *F24F 11/46* (2018.01); *F24F 11/56* (2018.01); *F24F 11/64* (2018.01); *F24F 11/65* (2018.01); *F24F 2110/00* (2018.01); *F24F 2110/10* (2018.01); *F24F 2110/12* (2018.01); *F24F 2110/20* (2018.01); *F24F 2140/30* (2018.01); *F24F 2140/60* (2018.01); *G05B 2219/2614* (2013.01)

(58) Field of Classification Search
CPC .... F24F 2110/20; F24F 11/65; F24F 2110/10; F24F 2110/00; F24F 11/64; F24F 11/46; F24F 2140/30; F24F 2140/60; F24F 11/56; G05D 22/00; G05B 19/042; G05B 2219/2614
USPC ......................................................... 700/276
See application file for complete search history.

(56) References Cited

U.S. PATENT DOCUMENTS

| | | | |
|---|---|---|---|
| 5,915,473 A * | 6/1999 | Ganesh | G05D 22/02 165/222 |
| 8,172,154 B1 * | 5/2012 | Figley | F24F 11/30 236/44 A |
| 2005/0017084 A1 | 1/2005 | Wacker | |
| 2008/0029611 A1 | 2/2008 | Schnell et al. | |
| 2015/0128628 A1* | 5/2015 | Kawagoe | F25B 13/00 62/160 |

* cited by examiner

SYSTEMS AND METHODS FOR GENERATING OPERATIONAL INTELLIGENCE FOR HEATING VENTILATION AND AIR CONDITIONING (HVAC) DEVICES

This application claims the benefit of Indian Patent Application Serial No. 201641011368 filed Mar. 31, 2016, which is hereby incorporated by reference in its entirety.

FIELD

This disclosure relates generally to Heating Ventilation and Air Conditioning (HVAC) devices, and more particularly to systems and methods for generating operational intelligence for HVAC devices.

BACKGROUND

In cold climatic zones, not operating HVAC devices during the time period when a building is unoccupied may lead to condensation inside the building envelope. In conventional methods, irrespective of the internal and external climatic conditions, the HVAC devices are switched on during winter season in order to prevent condensation inside the buildings even when the building is unoccupied. However, this methodology leads to increased energy consumption by the HVAC devices and also has an impact on the life of the HVAC devices.

SUMMARY

In one embodiment, a method for generating operational intelligence for a Heating Ventilation and Air Conditioning (HVAC) device is disclosed. The method includes detecting, via a plurality of sensors, a plurality of ambient parameters with respect to a building at periodic intervals, wherein the plurality of ambient parameters comprises an inside air ambient temperature, an outside air ambient temperature, and an inside air ambient relative humidity; computing, via a processor, a plurality of performance parameters at the periodic intervals based on the plurality of ambient parameters, wherein the plurality of performance parameters comprises an inside air water vapor pressure and an inside air dew point temperature; determining, via the processor, a plurality of operation parameters during an unoccupied period based on the plurality of ambient parameters and the plurality of performance parameters, wherein the plurality of operation parameters comprises a condensation occurrence point inside the building; and dynamically providing, via the processor, a recommendation regarding optimum operation for the HVAC device during the unoccupied period based on the plurality of operation parameters during the unoccupied period, wherein the recommendation comprises an operational state and a dynamic set point of operation.

In one embodiment, a system for generating operational intelligence for an HVAC device is disclosed. In one example, the system comprises at least one processor and a computer-readable medium storing instructions that, when executed by the at least one processor, cause the at least one processor to perform operations comprising detecting, via a plurality of sensors, a plurality of ambient parameters with respect to a building at periodic intervals, wherein the plurality of ambient parameters comprises an inside air ambient temperature, an outside air ambient temperature, and an inside air ambient relative humidity; computing, via a processor, a plurality of performance parameters at the periodic intervals based on the plurality of ambient parameters, wherein the plurality of performance parameters comprises an inside air water vapor pressure and an inside air dew point temperature; determining, via the processor, a plurality of operation parameters during an unoccupied period based on the plurality of ambient parameters and the plurality of performance parameters, wherein the plurality of operation parameters comprises a condensation occurrence point inside the building; and dynamically providing, via the processor, a recommendation regarding optimum operation for the HVAC device during the unoccupied period based on the plurality of operation parameters during the unoccupied period, wherein the recommendation comprises an operational state and a dynamic set point of operation.

In one embodiment, a non-transitory computer-readable medium storing computer-executable instructions for generating operational intelligence for an HVAC device is disclosed. In one example, the stored instructions, when executed by a processor, cause the processor to detect, via a plurality of sensors, a plurality of ambient parameters with respect to a building at periodic intervals, wherein the plurality of ambient parameters comprises an inside air ambient temperature, an outside air ambient temperature, and an inside air ambient relative humidity; compute a plurality of performance parameters at the periodic intervals based on the plurality of ambient parameters, wherein the plurality of performance parameters comprises an inside air water vapor pressure and an inside air dew point temperature; determine a plurality of operation parameters during an unoccupied period based on the plurality of ambient parameters and the plurality of performance parameters, wherein the plurality of operation parameters comprises a condensation occurrence point inside the building; and dynamically provide a recommendation regarding optimum operation for the HVAC device during the unoccupied period based on the plurality of operation parameters during the unoccupied period, wherein the recommendation comprises an operational state and a dynamic set point of operation.

It is to be understood that both the foregoing general description and the following detailed description are exemplary and explanatory only and are not restrictive of the technology, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
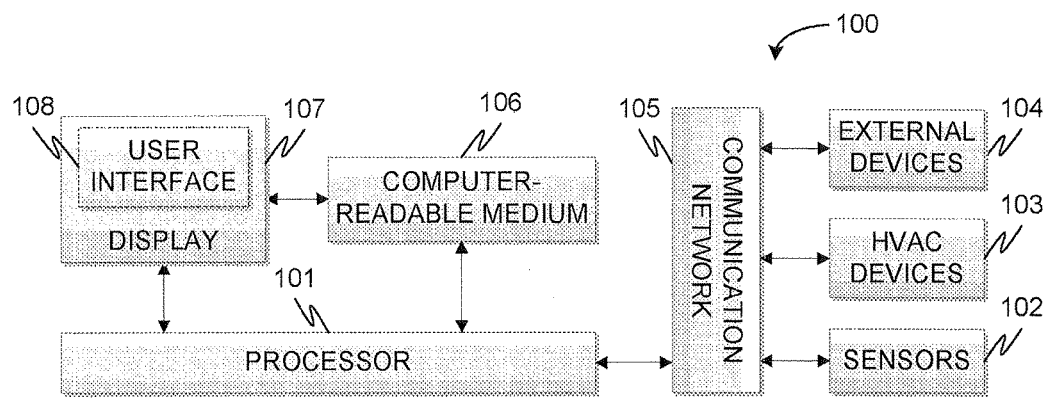
FIG. 1 is a block diagram of an exemplary system for operating Heating Ventilation and Air Conditioning (HVAC) devices in accordance with some embodiments of the present disclosure.

Referring now to FIG. 1, an exemplary system 100 for operating Heating Ventilation and Air Conditioning (HVAC) devices is illustrated in accordance with some embodiments of the present disclosure. In particular, the system 100 includes a processor 101 that may implement an operational intelligence generator for an HVAC device. The processor 101 communicates with sensors 102, HVAC devices 103, and external devices 104 through a communication network 105. Examples of the sensors 102 may include, but are not limited to dry bulb temperature sensors and relative humidity sensors. The data collected or gathered by the sensors 102 is sent to the processor 101 through the communication network 105. The communication network 105 may be a wired or a wireless network. Examples of the communication network 105 may include, but are not limited to the Internet, wireless Zig Bee, Wi-Fi, Ethernet, and GSM/GPRS. The processor 101 then analyzes this information to accordingly operate the HVAC devices 103 and the external devices 104 through the communication network 105. The processor 101 may perform this analysis based on instructions retrieved from a computer-readable medium 106. A result of the analysis thus performed may be rendered to a user through a display 107 and the user may interact with the result of the analysis through a user interface 108 of the display 107.

Figure 2:
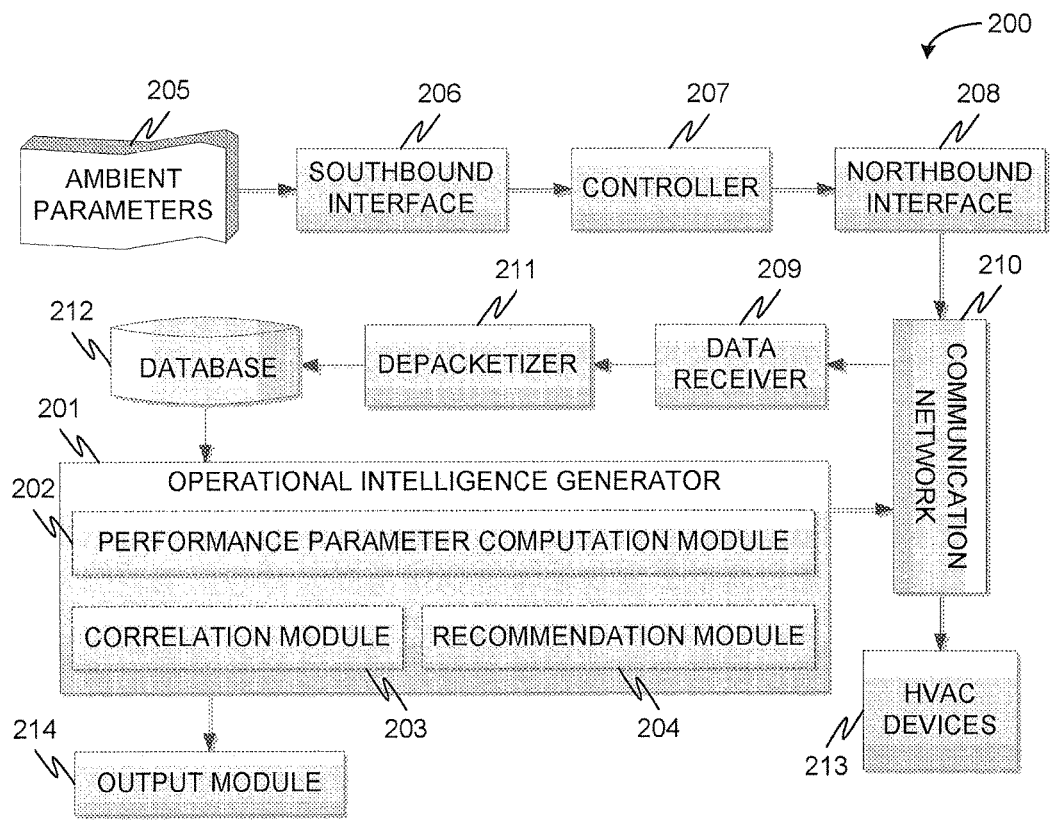
FIG. 2 is a functional block diagram of system for generating operational intelligence for an HVAC device in accordance with some embodiments of the present disclosure.

Referring now to FIG. 2, a functional block diagram of a system 200 for generating operational intelligence for an HVAC device is illustrated, in accordance with some embodiments of the present disclosure. The system 200 may be installed within premises of a building. To generate operational intelligence, the system 200 includes an operational intelligence generator 201 that may further include a performance parameter computation module 202, a correlation module 203, and a recommendation module 204.

In the system 200, ambient parameters 205 associated with the building are detected and gathered using a plurality of sensors at periodic intervals. The periodic intervals may be varied based on the location of the building and the time of the year. Some of the plurality of sensors may be disposed inside the building, while some may be disposed outside the building. In an embodiment, a set of sensors from the plurality of sensors that is disposed outside the building is disposed on the north side of the building. The plurality of sensors may include, but are not limited to dry bulb temperature sensors and relative humidity sensors. By way of an example, dry bulb temperature sensors may be placed both inside and outside the building and the relative humidity sensors are placed inside the building. The ambient parameters 205 may include, but are not limited to inside air ambient temperature, an outside air ambient temperature, and an inside air ambient relative humidity. Thus, in continuation of the example given above, inside and outside air ambient temperature may be gathered by dry bulb sensors and inside air ambient relative humidity may be gathered by the relative humidity sensor.

Thereafter, a southbound interface 206 collects the ambient parameters 205 from the plurality of sensors and communicates them to a controller 207. The controller 207 further forwards the ambient parameters 205 to a northbound interface 208. The southbound interface 206 and the northbound interface 208 together form the gateway for energy management in the system 200. The northbound interface 208 further transmits the ambient parameters 205 to a data receiver 209 through a communication network 210. The communication network 210, for example, may include, but is not limited to the Internet, wireless Zig Bee, Wi-Fi, Ethernet, and GSM/GPRS. The data receiver 209 accepts data (i.e., the ambient parameters 205) from any client device through the communication network 210. For example, when the communication network 210 is the Internet, the data receiver 209 accepts data through TCP/IP. The data residing at the data receiver 209 in in raw format (for example, hexadecimal format). Thus, to convert this raw data into a user readable format, the data receiver 209 forwards it to a depacketizer 211. After converting the raw data into a user readable format, the depacketizer 211 stores the converted data in a database 212. In an embodiment, in the depacketizer 211, the hexadecimal value will be converted into double precision floating value, which is temperature value.

The operational intelligence generator 201 then retrieves the stored data (which includes the ambient parameters 205) from the database 212. The performance parameter computation module 202 then computes a plurality of performance parameters at the periodic intervals based on the ambient parameters 205. The plurality of performance parameters may include an inside air water vapor pressure. In an embodiment, the inside air water vapor pressure may be computed based on the inside air ambient relative humidity and the inside air ambient temperature. The plurality of performance parameters may further include an inside air dew point temperature. In an embodiment, the inside air dew point temperature may be computed based on the inside air water vapor pressure.

After calculating the plurality of performance parameters, the correlation module 203 determines a plurality of operation parameters during an unoccupied period based on the plurality of ambient parameters and the plurality of performance parameters. The unoccupied period is the time during which the building is not occupied at all or is occupied only by a few people. Such unoccupied period, for example, may include the period during night, holiday, or a weekend. During the unoccupied period, HVAC devices 213 should ideally be switched off to save energy. However, completely switching off the HVAC devices 213 for the entire unoccupied duration, may lead to moisture formation inside the walls of the building.

In an embodiment, the correlation module 203 may correlate the plurality of ambient parameters and the plurality of performance parameters to determine the plurality of operation parameters. The plurality of operation parameters include a condensation occurrence point inside the building. The correlation module 203 may identify the condensation occurrence point by correlating the outside air ambient temperature with the inside air dew point temperature. The correlation module 203 may detect that condensation may occur, when the outside air ambient temperature is below the inside air dew point temperature. In other words, the correlation module 203 identifies the condensation occurrence point. However, when the outside air ambient temperature is above the inside air dew point temperature, then the correlation module 203 may determine that there is no possibility of prevalence of moisture inside the walls of the building. In other words, the condensation occurrence point will not be reached in this scenario. Thus, when such a condition is met, the HVAC devices 213 can be completely switched off during the unoccupied period. As a result, neither the problem of moisture formation will occur, nor will the HVAC devices 213 be operated unnecessarily to resolve an issue, i.e., moisture formation, which will not occur.

Based on the plurality of operation parameters, the recommendation module 204 dynamically provides a recommendation regarding optimum operation for the HVAC devices 213 during the unoccupied period. The recommendation includes an operational state and a dynamic set point of operation of the HVAC devices 213. In an embodiment, when the outside air ambient temperature is higher than the inside air dew point temperature, the recommendation module 204 may dynamically provide a recommendation that the HVAC devices 213 should not be operated. Accordingly, operational intelligence generator 201 communicates instructions to the HVAC devices 213 not to operate during the unoccupied period.

However, when the outside air ambient temperature is lower than the inside air dew point temperature, the recommendation module 204 may provide a recommendation to operate the HVAC devices 213 at the dynamic set point. The dynamic set point may be determined based on the condensation occurrence point inside the building. Accordingly, operational intelligence generator 201 communicates instructions to the HVAC devices 213 to operate at the dynamic set point during the unoccupied period. The dynamic set point may be set dynamically at the controller level of Roof Top Units (RTUs) or Air Handling Unit (AHUs), in order to reduce the total number of run hours of the HVAC devices 213. In order to further optimize the run hours of the HAVC devices 213, whenever the condensation occurrence point starts, the dynamic set point of an indoor unit of the HVAC devices 213 should be restricted below a threshold value.

The analysis performed by the operational intelligence generator 201 on whether to operate or not to operate the HVAC devices 213 and a result of such analysis, may be rendered to users through an output module 214. The output module 214 may, for example, be a display unit of an electronic device in communication with the operational intelligence generator 201. In an embodiment, both the operational intelligence generator 201 and the output module 214 may be a part of the electronic device.

The above described system provides analytical models that help in performing intelligent diagnostics of the HVAC units ensuring the right operational transformation in the building. As a result of selectively operating the HVAC devices based on the inside/outside air ambient temperature and the inside air ambient relative humidity during the unoccupied period, the energy consumption by the HVAC devices is optimized and the problem of moisture formation inside the building walls is also solved. The optimized running hours of the HVAC devices result in reduced operational costs for HVAC devices and increased life.

As will be appreciated by one skilled in the art, a variety of processes may be employed for generating operational intelligence for an HVAC device. For example, the system 200 may generate operational intelligence for an HVAC device by the processes discussed herein. In particular, as will be appreciated by those of ordinary skill in the art, control logic and/or automated routines for performing the techniques and steps described herein may be implemented by the system 200, either by hardware, software, or combinations of hardware and software. For example, suitable code may be accessed and executed by the one or more processors on the system 200 to perform some or all of the techniques described herein. Similarly application specific integrated circuits (ASICs) configured to perform some or all of the processes described herein may be included in the one or more processors on the system 200.

Figure 3:
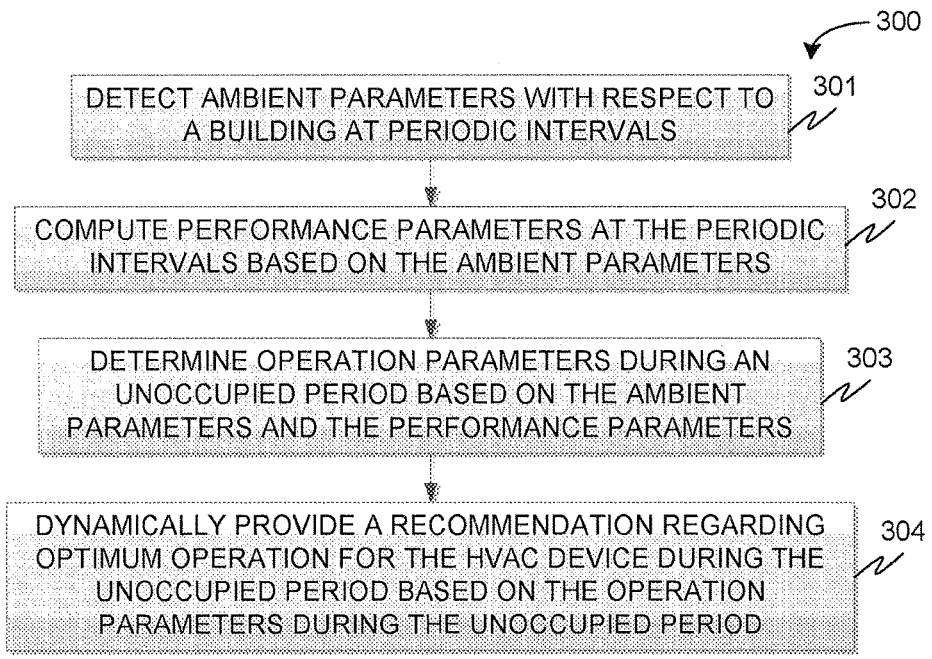
FIG. 3 is a flow diagram of an exemplary process for generating operational intelligence for an HVAC device in accordance with some embodiments of the present disclosure.

For example, referring now to FIG. 3, exemplary control logic 300 for generating operational intelligence for an HVAC device via a system, such as the system 200, is depicted via a flowchart in accordance with some embodiments of the present disclosure. As illustrated in the flowchart, the control logic 300 includes the steps of detecting ambient parameters with respect to a building at periodic intervals at step 301. The ambient parameters include an inside air ambient temperature, an outside air ambient temperature, and an inside air ambient relative humidity. The control logic 300 further includes computing performance parameters at the periodic intervals based on the ambient parameters at step 302. The performance parameters include an inside air water vapor pressure and an inside air dew point temperature. This is further explained in detail in conjunction with FIG. 4 given below.

The control logic 300 includes determining operation parameters during the unoccupied period based on the ambient parameters and the performance parameters at step 303. The operation parameters include a condensation occurrence point inside the building. In an embodiment, the control logic 300 may correlate the ambient parameters and the performance parameters to determine the operation parameters. Thereafter, the control logic 300 includes dynamically providing a recommendation regarding optimum operation for the HVAC device during the unoccupied period based on the operation parameters during the unoccupied period at step 304. The recommendation includes an operational state and a dynamic set point of operation. This has been explained in detail in conjunction with FIG. 2 given above.

Figure 4:
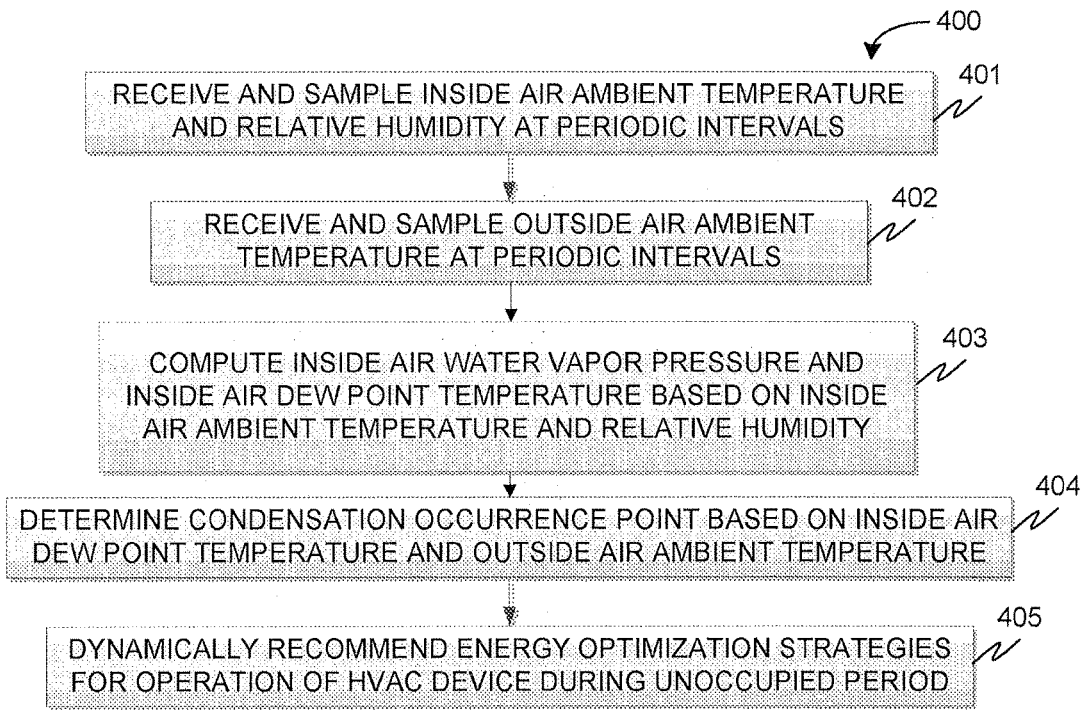
FIG. 4 is a flow diagram of a detailed exemplary process for generating operational intelligence for an HVAC device in accordance with some embodiments of the present disclosure.

Referring now to FIG. 4, exemplary control logic 400 generating operational intelligence for an HVAC device is depicted in greater detail via a flowchart in accordance with some embodiments of the present disclosure. As illustrated in the flowchart, the control logic 400 starts upon receiving and sampling inside air ambient temperature and inside air ambient relative humidity at periodic intervals at step 401 from a plurality of sensors. The periodic intervals may be varied based on the location of the building and the time of the year. The plurality of sensors may include, but are not limited to dry bulb temperature sensors and relative humidity sensors. The inside air ambient temperature is gathered by a dry bulb sensor placed inside the building and the inside air ambient relative humidity is gathered by the relative humidity sensor placed inside the building.

The control logic 400 further includes receiving and sampling outside air ambient temperature at the periodic intervals at step 402. In other words, the inside air ambient temperature, the outside air ambient temperature, and the inside air ambient relative humidity are all received at the same time instant by one or more of the plurality of sensors. In case of the outside air ambient temperature, a dry bulb sensor placed outside the building captures this ambient parameter.

Thereafter, the control logic 400 includes computing inside air water vapor pressure and inside air dew point temperature based on the inside air ambient temperature and the inside air ambient relative humidity at step 403. In an exemplary embodiment, the inside air water vapor pressure may be computed using the equation 1 given below:

$$AWVP = 0.01 * RelHum * c1 * (\exp((c2 * DryBulb)/(c3 + DryBulb))) \quad (1)$$

where,

AWVP is the inside air water vapor pressure,
RelHum is the inside air ambient relative humidity value,
DryBulb is the inside air ambient temperature,
$c1 = 6.0178$,
$c2 = 17.08085$, and
$c3 = 234.175$.

The inside air dew point temperature may be computed based on the inside air water vapor pressure. In an exemplary embodiment, the inside air dew point temperature may be computed using equation 2 given below:

$$ADPT = 237.3 * \ln(AWVP/6.1078))/(17.27 - (\ln(AWVP/6.1078))) \quad (2)$$

where,

ADPT is the inside air dew point temperature, and
AWVP is the inside air water vapor pressure.

The control logic 400 further includes determining condensation occurrence point based on inside air dew point temperature and outside air ambient temperature at step 404. The condensation occurrence point may be identified by correlating the outside air ambient temperature with the inside air dew point temperature. Condensation may occur, when the outside air ambient temperature is below the inside air dew point temperature. However, when the outside air ambient temperature is above the inside air dew point temperature, there is no possibility of prevalence of moisture inside the walls of the building. In other words, the condensation occurrence point will not be reached in this scenario. Thus, when such a condition is met, the HVAC devices can be completely switched off during the unoccupied period.

After determining the condensation occurrence point, the control logic 400 includes dynamically recommending energy optimization strategies for operation of HVAC devices during the unoccupied period at step 405. The recommendation includes an operational state and a dynamic set point of operation of the HVAC devices. In an embodiment, when the outside air ambient temperature is higher than the inside air dew point temperature, a recommendation that the HVAC devices should not be operated may be dynamically provided. Accordingly, instructions may be communicated to the HVAC devices not to operate during the unoccupied period.

However, when the outside air ambient temperature is lower than the inside air dew point temperature, a recommendation to operate the HVAC devices at the dynamic set point may be provided. The dynamic set point may be determined based on the condensation occurrence point inside the building. Accordingly, instructions may be communicated to the HVAC devices to operate at the dynamic set point during the unoccupied period. The dynamic set point may be set dynamically at the controller level of Roof Top Units (RTUs) or Air Handling Unit (AHUs), in order to reduce the total number of run hours of the HVAC devices. In order to further optimize the run hours of the HAVC devices, whenever the condensation occurrence point starts, the dynamic set point of an indoor unit of the HVAC devices should be restricted below a threshold value.

The method described above provides analytical models that help in performing intelligent diagnostics of the HVAC units ensuring the right operational transformation in the building. As a result of selectively operating the HVAC devices based on the inside/outside air ambient temperature and the inside air ambient relative humidity during the unoccupied period, the energy consumption by the HVAC devices is optimized and the problem of moisture formation inside the building walls is also solved. The optimized running hours of the HVAC devices result in reduced operational costs for HVAC devices and increased life.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the disclosed technology. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the disclosed technology. When implemented on a general-purpose microprocessor, the computer program code segments configure the microprocessor to create specific logic circuits.

Figure 5:
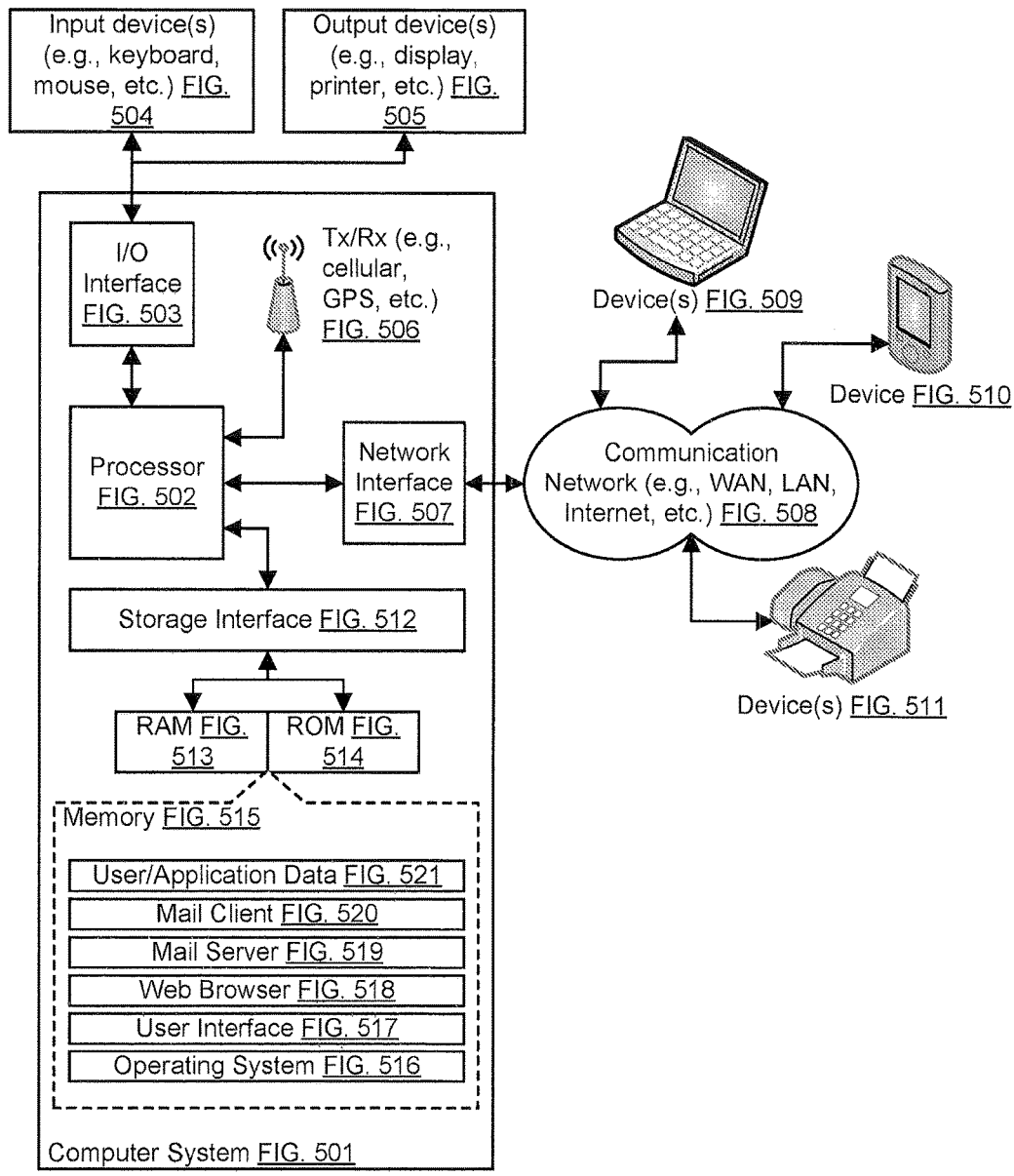
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing system 200 for generating operational intelligence for HVAC devices. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft.NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., image, image data, a pre-defined set of characters, machine learning algorithms, parameters for each of the algorithms, generated text, output of algorithms, suggested characters, new characters labelled by the user, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

Various embodiments of the present technology provide systems and methods for generating operational intelligence for HVAC devices. The method provides analytical models that help in performing intelligent diagnostics of the HVAC units ensuring the right operational transformation in the building. As a result of selectively operating the HVAC devices based on the inside/outside air ambient temperature and the inside air ambient relative humidity during the unoccupied period, the energy consumption by the HVAC devices is optimized and the problem of moisture formation inside the building walls is also solved. The optimized running hours of the HVAC devices result in reduced operational costs for HVAC devices and increased life.

The specification has described systems and methods for generating operational intelligence for HVAC devices. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for generating operational intelligence for a HVAC device, the method comprising:
receiving, via a processor, a plurality of ambient parameters with respect to a building at periodic intervals from a plurality of sensors communicatively coupled to the processor, wherein the plurality of ambient parameters comprises an inside air ambient temperature, an outside air ambient temperature, and an inside air ambient relative humidity;
computing, via the processor, a plurality of performance parameters at the periodic intervals based on the plurality of ambient parameters, wherein the plurality of performance parameters comprises an inside air water vapor pressure and an inside air dew point temperature;
determining, via the processor, a plurality of operation parameters during an unoccupied period based on the plurality of ambient parameters and the plurality of performance parameters, wherein the plurality of operation parameters comprises a condensation occurrence point inside the building;
dynamically providing, via the processor, a recommendation regarding optimum operation for the HVAC device during the unoccupied period based on the plurality of operation parameters during the unoccupied period, wherein the recommendation comprises an operational state and a dynamic set point of operation;
and operating, via the processor, the HVAC device during the unoccupied period based on the recommendation.

2. The method of claim 1, wherein computing the plurality of performance parameters comprises computing the inside air water vapor pressure based on the inside air ambient relative humidity and the inside air ambient temperature.

3. The method of claim 1, wherein computing the plurality of performance parameters comprises computing the inside air dew point temperature based on the inside air water vapor pressure.

4. The method of claim 1, wherein determining the plurality of operation parameters comprises correlating the plurality of ambient parameters and the plurality of performance parameters.

5. The method of claim 1, wherein determining the plurality of operation parameters comprises determining the condensation occurrence point inside the building by correlating the inside air dew point temperature and the outside air ambient temperature.

6. The method of claim 1, wherein the dynamic set point is based on the condensation occurrence point inside the building.

7. The method of claim 1, wherein dynamically providing the recommendation comprises a recommendation to not operate the HVAC device when the outside air ambient temperature is higher than the inside air dew point temperature.

8. The method of claim 1, wherein dynamically providing the recommendation comprises a recommendation to operate the HVAC device at the dynamic set point when the outside air ambient temperature is lower than the inside air dew point temperature.

9. The method of claim 1, wherein a set of sensors from the plurality of sensors that is disposed outside the building is disposed on the north side of the building.

10. An operational intelligence computing device for generating operational intelligence for a HVAC device, the device comprising a processor and a memory coupled to the processor which is configured to execute one or more programmed instructions comprising and stored in the memory to:
receive a plurality of ambient parameters with respect to a building from a plurality of sensors at periodic intervals, wherein the plurality of ambient parameters comprises an inside air ambient temperature, an outside air ambient temperature, and an inside air ambient relative humidity;
compute a plurality of performance parameters at the periodic intervals based on the plurality of ambient parameters, wherein the plurality of performance parameters comprises an inside air water vapor pressure and an inside air dew point temperature;

determine a plurality of operation parameters during an unoccupied period based on the plurality of ambient parameters and the plurality of performance parameters, wherein the plurality of operation parameters comprises a condensation occurrence point inside the building;

dynamically provide a recommendation regarding optimum operation for the HVAC device during the unoccupied period based on the plurality of operation parameters during the unoccupied period, wherein the recommendation comprises an operational state and a dynamic set point of operation, wherein the processor and the memory coupled to the processor is further configured to execute one or more programmed instructions comprising and stored in the memory to: operate the HVAC device during the unoccupied period based on the recommendation.

11. The device of claim 10, wherein computing the plurality of performance parameters comprises computing the inside air water vapor pressure based on the inside air ambient relative humidity and the inside air ambient temperature.

12. The device of claim 10, wherein computing the plurality of performance parameters comprises computing the inside air dew point temperature based on the inside air water vapor pressure.

13. The device of claim 10, wherein determining the plurality of operation parameters comprises correlating the plurality of ambient parameters and the plurality of performance parameters.

14. The device of claim 10, wherein determining the plurality of operation parameters comprises determining the condensation occurrence point inside the building by correlating the inside air dew point temperature and the outside air ambient temperature.

15. The device of claim 10, wherein the dynamic set point is based on the condensation occurrence point inside the building.

16. The device of claim 10, wherein dynamically providing the recommendation comprises a recommendation to not operate the HVAC device when the outside air ambient temperature is higher than the inside dew point temperature.

17. The device of claim 10, wherein dynamically providing the recommendation comprises a recommendation to operate the HVAC at the dynamic set point when the outside air ambient temperature is lower than the inside dew point temperature.

18. The device of claim 10, wherein a set of sensors from the plurality of sensors that is disposed outside the building is disposed on the north side of the building.

* * * * *